June 11, 1968   J. R. GATELY   3,388,316
TEMPERATURE COMPENSATION OF CURRENT LIMITING IN
REGULATED POWER SUPPLIES
Filed Aug. 27, 1964   2 Sheets-Sheet 1

INVENTOR.
JOSEPH R. GATELY
BY
*Alfred W. Barber*
ATTORNEY

INVENTOR.
JOSEPH R. GATELY
BY
ATTORNEY

United States Patent Office 3,388,316
Patented June 11, 1968

3,388,316
TEMPERATURE COMPENSATION OF CURRENT LIMITING IN REGULATED POWER SUPPLIES
Joseph R. Gately, Woodside, N.Y., assignor to Forbro Design Corp., New York, N.Y., a corporation of New York
Filed Aug. 27, 1964, Ser. No. 392,401
7 Claims. (Cl. 323—9)

ABSTRACT OF THE DISCLOSURE

The present invention is a temperature stabilized circuit for current limiting in a volting regulated power supply. The negative temperature coefficient elements of the current limiting circuit, tending to cause run away, are balanced by positive temperature coefficient elements resulting in a temperature stable circuit.

The present invention concerns regulated power supplies and, in particular, temperature compensation for stabilizing the short circuit current of such power supplies.

Summary

The present invention applies to current limiting circuits in a "bridge" type voltage regulating circuit in which a current sensing resistor is used between the series pass transistor or transistors and the output terminal to limit the maximum or short-circuit current of the power supply. The current generated voltage drop across this resistor is fed back in such a phase as to cause the resistance of the pass transistor to increase as the output current increases thereby causing the output current to stabilize at a predetermined maximum value. In order to increase the sensitivity of the limiting circuit transistors may be included in the feedback path. It has been found, however, that the steady voltage drop in the feedback path made up largely of the base to emitter drops of the transistors decreases as temperature increases. Without a counter effect, the system tends to run away. It has been found that if the sensing resistor is chosen to have a suitable positive temperature coefficient, that this decreasing voltage can be countered by the drop across the sensing resistor and the system rendered stable and safe.

Voltage regulated power supplies are power supplies designed to maintain a constant output or load voltage. The type of voltage regulated power supply with which the present invention is concerned includes a source of unregulated voltage, a series pass element, an error amplifier and a control bridge including a reference voltage. Such a voltage regulated power supply is designed to supply a constant voltage to loads having a wide range of values. However, a problem arises when the load becomes very heavy as when the power supply is short circuited. When such a power supply is shorted, the series pass element is called on to absorb the power from the unregulated source. When the series pass element is a transistor, absorbing the power from the unregulated source tends to overheat the transistor which may result in permanent damage. One method of providing short circuit protection to the type of voltage regulated power supply here-in described is to limit the current which can be drawn by a short condition and thereby to limit the dissipation in the pass transistor. The current limiting is accomplished by means of a resistor connected between the series pass element and the load terminal and a feed-back circuit which operates to limit the conduction of the pass element when more than a predetermined current is passed through the series resistor. The feed-back circuit in its simplest form consists of a diode and a source of reference voltage connected in series. In order to provide a sharper limiting characteristic one or more transistors may be substituted for the diode in the feed-back circuit.

The short circuit current limiting circuit described above, however, exhibits a regenerative characteristics when the ambient temperature is raised. When the ambient temperature is raised, the voltage drops across the transistors in the feed-back circuit decrease permitting more current to flow in the pass transistor. More current flowing in the pass transistor causes more heat to be generated in the pass transistor which raises the ambient further and hence causes a regenerative action. For this reason the short circuit current will increase as the ambient temperature increases and since the effect is regenerative the system may even "run away."

It has been found possible in accordance with the present invention to provide temperature degeneration in the current limiting circuit so that the short circuit current remains substantially constant as the ambient temperature increases. Among other things this considerably increases the safety factor and reliability of a voltage regulated power supply under short circuit conditions. The voltage drop across the transistor or transistors in the feed-back circuit decreases as the temperature increases and it has been found possible to construct a current sensing resistor of high positive temperature coefficient wire which provides a constant and temperature degenerative condition when used in the current limiting circuit.

Briefly, it has been found that in a current limiting circuit of the type shown in U.S. Patent No. 3,131,344 and with transistor amplification in the feed-back loop, if the current sensing resistor is made of wire having a positive temperature coefficient of the order of 0.5 percent per degree C. such as iron or nickel that the short circuit current will remain substantially constant with time and for variations in ambient temperature. The current sensing resistor is subject to considerable heating in the case of a prolonged short on the power supply and since it is required to dissipate considerable power there will be heating due to this power dissipation which adds to any ambient temperature increases. It has also been found that the sum of the decreases in voltage around the loop in the transistor amplifiers is of the order of 5 millivolts per degree C. A current sensing resistor chosen to have a voltage drop of 1 volt at a predetermined short circuit current and having a positive temperature coefficient of 0.5 percent per degree C. will have a cancelling positive increase in drop of 5 millivolts per degree C. Nickel and iron wire are suitable for use as the current sensing resistor since they have the required temperature coefficient and at the same time sufficient resistivity to provide a resistor of convenient physical size.

Accordingly one object of the present invention is to provide a current limiting circuit for regulated power supplies and the like which provides improved current limiting characteristics.

Another object is to provide a current limiting circuit which is stable under all conditions of ambient temperature.

A still further object is to provide a current limiting circuit and method which is degenerative with respect to temperature.

These and other objects will be apparent from the detailed description of the invention given in connection with the figures of the drawing.

Figure 1:
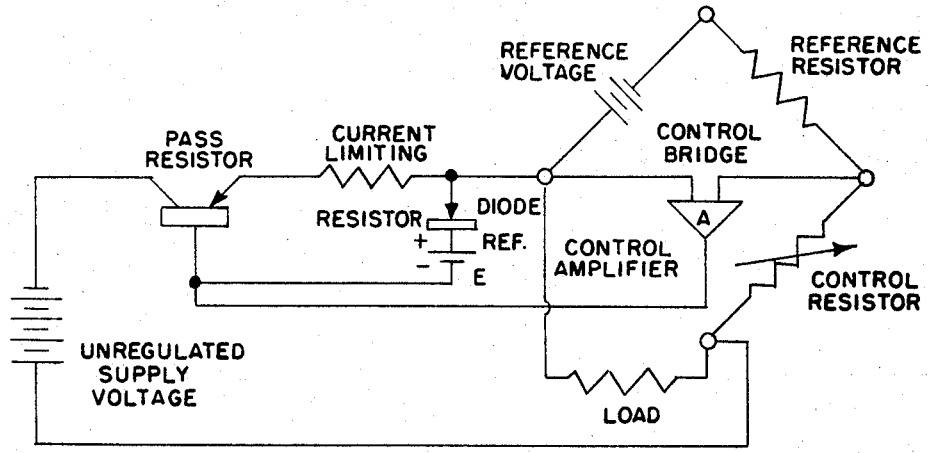
FIGURE 1 is a simplified schematic circuit diagram of a current limited regulated power supply on accordance with the prior art.

The background for the present invention can be gathered from U.S. Patents Nos. 3,028,538 and 3,131,344. In the first patent the basic regulated power supply circuit of FIG. 1 is shown and described. In FIG. 1 there has been added the current limiting circuit as shown and described in the second patent referred to above. The present invention concerns improvements in this current limiting circuit.

Figure 2:
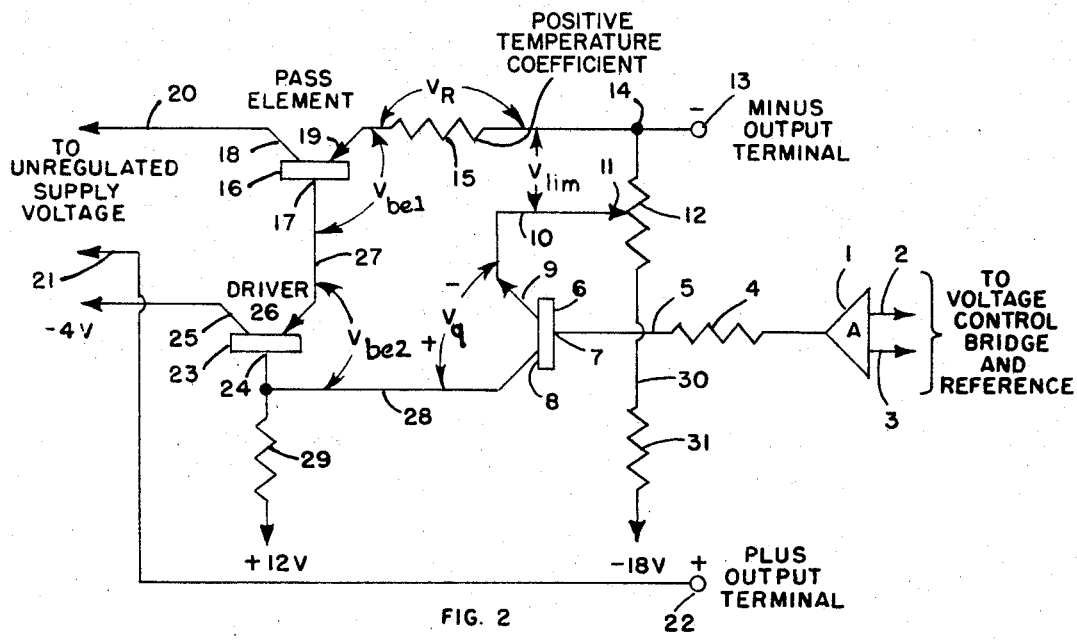
FIGURE 2 is a schematic circuit diagram showing in detail a portion of a regulated power supply circuit embodying the present invention.

FIG. 2 shows control amplifier 1 with input leads 2 and 3 and output through resistor 4 over lead 5 to base 7 of transistor 6. Pass transistor 16 is shown including base 17 connected over lead 26 to emitter 26 of driver transistor 23; collector 18 connected to a source of unregulated supply voltage (not shown) over lead 20; and emitter 19 connected through current sensing resistor 15 to the minus output terminal 13. The positive output terminal 22 is connected over lead 21 to the positive side of the unregulated supply voltage source (not shown). Driver transistor 23 includes collector 25 connected to a suitable source of negative voltage (not shown) indicated as −4 volts, and base 24 connected through resistor 29 to a source of reverse bias (not shown) indicated as +12 volts and over lead 28 to collector 8 of transistor 6. The emitter 9 of transistor 6 is connected over lead 10 to variable contact 11 on potentiometer 12. Potentiometer 12 is connected from point 14 on the negative output line to resistor 31 over lead 30. Resistor 31 is connected to a suitable source of negative voltage (not shown) indicated as −18 volts. The resulting voltage drop between variable contact 11 and point 14 consisting in a negative voltage with respect to the negative terminal 13 provides a reference voltage for the current limiting circuit designated as $V_{llm}$.

During normal operation of the system a positive output voltage from amplifier 1 and applied to base 7 is reversed in polarity at collector 8 and is relayed through drive transistor 23 to drive base 17 negatively. This negative drive controlled by the bridge circuit as shown in FIG. 1 and passed along as described above causes pass transistor 18 to conduct and to supply a controlled current to output terminal 13.

However, if the output of this regulated power supply is overloaded as by shorting its output terminals 13 and 22, the system will be called on to supply more current than it is designed to supply and damage will result as, for example, over-heating of pass transistor 16. The output current of the power supply passes through resistor 15 and establishes a voltage drop thereacross. Now considering a closed path through resistor 15 the voltages around the loop will be $$V_{be1} = V_{llm} - V_q - V_{be2} - V_R$$

The voltage $V_{be1}$ at which transistor 16 conducts will depend on the transistor being about 0.2 volt for germanium and 0.7 volt for silicon. Under overload or short circuit conditions $V_R$ is increased until the right hand side of the equation is equal to a voltage $V_{be1}$ which will cause pass transistor 16 to supply a predetermined current. This predetermined current may be chosen by varying $V_{llm}$ by moving variable contact 11 on potentiometer 12.

It will be seen that the transistor drops $V_Q$ and $V_{be2}$ are in the same direction as $V_R$ so that if these transistor voltages decrease in absolute magnitude, the above equation will call for an increase in the absolute magnitude $V_R$. An increase in $V_R$ means an increase in output or short circuit current. Now, since the transistor voltages $V_q$ and $V_{be2}$ decrease in absolute magnitude as the temperature of the transistors increase, the output or short circuit current of the power supply will rise with increased ambient temperatures. Rising current will increase heating in the transistor 16 and current sensing resistor 15 causing a further increase in output or short circuit current and so on resulting in a curve of short circuit or overload as shown in curve A in FIG. 3. Not only is the safety factor of the system reduced but under extreme conditions the system may even "run away." Such a condition is called regenerative.

Figure 3:
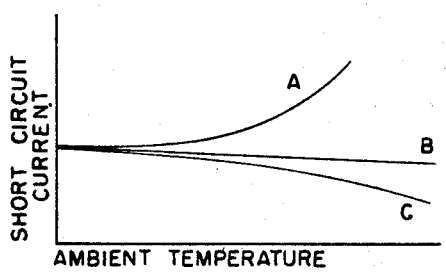
FIGURE 3 is a set of curves illustrating the operating characteristics of the present invention.

It has been found possible to provide either curve B or curve C of FIG. 3 by suitable manipulation of the circuit particularly by using a highly positive temperature coefficient resistance material in resistor 15. In one particular case the right hand side of the equation above was found to increase at the rate of 5 millivolts per degree C. increase in temperature. This can be balanced by $V_R$ from a resistor having 1 volt drop at the limiting current and 0.5 percent per degree C. positive temperature coefficient. Such a resistor produces curve B of FIG. 3. A resistor providing a larger voltage drop or having a larger temperature coefficient will provide a temperature degenerative effect as illustrated by curve C of FIG. 3. This may be called temperature feed-back since any tendency for the current to increase will cause increased heating in resistor 15 thus increasing its voltage drop and tending to decrease the current passed by the pass transistor 16.

Figure 4:
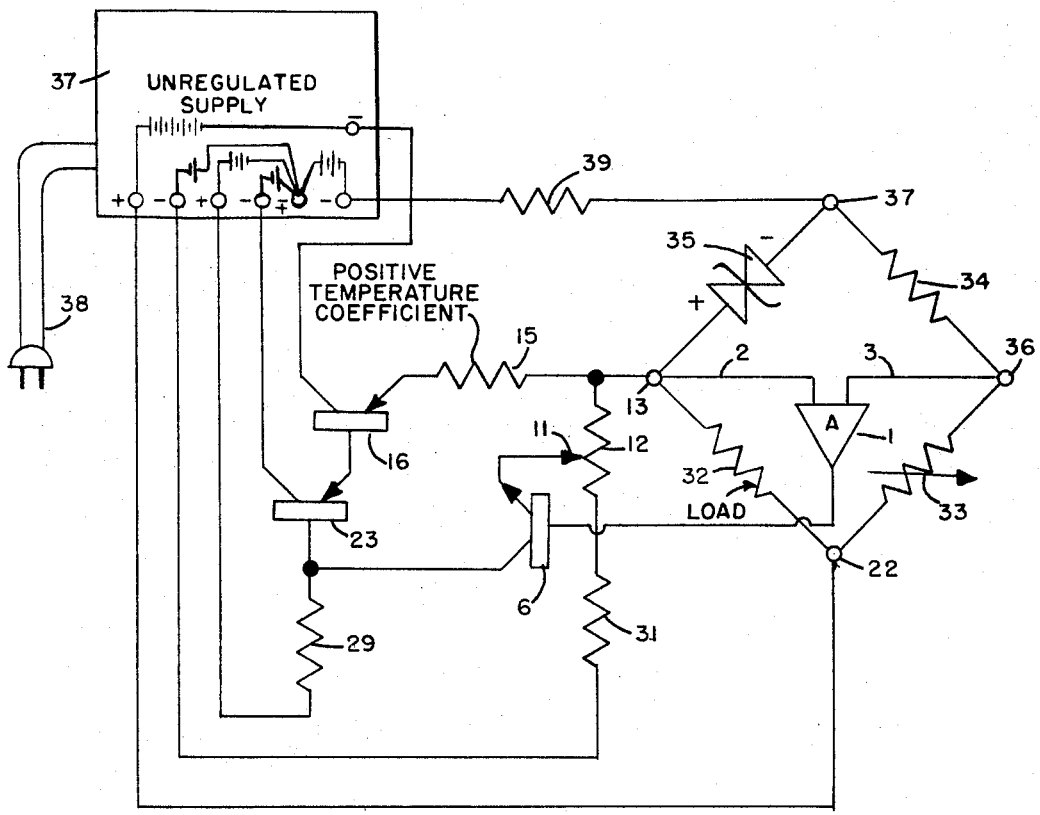
FIGURE 4 is the circuit of FIG. 2 with parts to complete a regulated power supply shown.

FIG. 4 shows the invention as illustrated in FIG. 2 with additional parts specified to complete a regulated power supply circuit. The unregulated supply 37 is provided with suitable AC line connecting means 38 and provides the voltages to the various parts of the circuit as described in detail in connection with FIG. 2 above. The same designation numbers are used to identify corresponding parts to those of FIG. 2. Amplifier 1 is connected to a reference bridge circuit having the four terminals 13, 22, 36 and 37. The load 32 to be supplied with power is connected between output terminals 13 and 22. A variable voltage determining resistor 33 is connected between terminals 22 and 36. A reference voltage determining Zener diode 35 is connected between terminals 13 and 37 and bridge current determining resistor 34 is connected between terminals 36 and 37. Current is supplied to the voltage reference, Zener diode from unregulated supply 37 through current limiting resistor 39. This circuit has been described in detail above in connection with FIG. 2.

While only one form of the present invention has been shown and described, many modifications will be apparent to those skilled in the art and within the spirit and scope of the invention as set forth in particular in the appended claims.

What is claimed is:

1. A current limiting regulated power supply including, in combination,
   a source of voltage to be regulated,
   a pair of output terminals for said supply,
   at least one series pass transistor including at least a collector, an emitter and a base, and a current sensing resistor exhibiting a predetermined positive temperature coefficient connected in series between said voltage source and one of said output terminals, said resistor being connected between said transistor and the said terminal,
   and a feed-back path connected between the terminal end of said resistor and said base of said pass transistor including at least one transistor for limiting the output current of said power supply,
   wherein said temperature coefficient is chosen to provide an incremental increase in voltage across said resistor in the presence of an increase in temperature substantially equal to the incremental decrease in voltage in said feed-back path.

2. A current limiting regulated power supply including, in combination,
   a source of voltage to be regulated,
   a pair of output terminals for said supply,
   at least one series pass transistor including at least a collector, an emitter and a base, and a current sensing resistor exhibiting a predetermined positive temperature coefficient connected in series between said voltage source and one of said output terminals, said resistor being connected between said transistor and the last said terminal, and a feed-back path connected between the terminal end of said resistor and said base of said pass transistor including two transistors in cascade for limiting the output current of said power supply, wherein said temperature coefficient is chosen to provide an incremental increase in current sensing voltage across said resistor due to an increase in temperature substantially equal to the incremental decrease in voltage drop of the base to emitter junctions of said two transistors due to the increase in temperature.

3. A current limiting regulated power supply as set forth in claim 1 and including an adjustable source of voltage in series with the feed-back path for setting the point at which current limiting begins in said power supply.

4. A current limiting regulated power supply as set forth in claim 1 wherein said feed-back path includes at least one transistor base to emitter junction in series.

5. A current limiting regulated power supply including, in combination, a source of voltage to be regulated, a pair of output terminals for said supply, at least one series pass transistor including at least a collector, an emitter and a base, and a positive temperature coefficient current sensing resistor connected in series between said voltage source and one of said output terminals, said resistor being connected between said transistor and the last said terminal, and a feed-back path connected between the terminal end of said resistor and said base of said pass transistor including at least one PN transistor base to emitter junction in series for limiting the output current of said power supply, wherein said positive temperature coefficient is chosen to provide a rate of incremental increase in voltage across said resistor due to increase in temperature substantially equal to the rate of decrease of voltage across said solid state junction.

6. A current limiting regulated power supply as set forth in claim 5 and including an adjustable source of voltage in series with the feed-back path for setting the point at which current limiting begins in said power supply.

7. A current limiting regulated power supply as set forth in claim 2 and including an adjustable source of voltage in series with the feed-back path for setting the point at which current limiting begins in said power supply.

References Cited

UNITED STATES PATENTS

| | | | |
|---|---|---|---|
| 2,693,572 | 11/1954 | Chase | 323—22 |
| 2,962,665 | 11/1960 | Greatbatch | 317—148.5 X |
| 3,117,253 | 1/1964 | Antoszewski | 317—131 |
| 3,188,576 | 6/1965 | Lewis | 330—23 |
| 3,255,420 | 6/1966 | Kukla et al. | 330—23 |
| 3,289,105 | 11/1966 | Funfstuck | 307—88.5 |
| 3,131,344 | 4/1964 | Rosenfeld et al. | 323—22 |
| 3,101,442 | 8/1963 | Darbie et al. | 323—22 |
| 3,076,135 | 1/1963 | Farnsworth et al. | 323—22 |
| 3,069,617 | 12/1962 | Mohler | 323—22 |
| 2,889,512 | 6/1959 | Ford et al. | 323—22 |

LEE T. HIX, *Primary Examiner.*

M. WACHTELL, A. D. PELLINEN, *Assistant Examiners.*